United States Patent
Morris

(10) Patent No.: US 10,053,387 B2
(45) Date of Patent: Aug. 21, 2018

(54) GLASS MICROBUBBLES, RAW PRODUCT, AND METHODS OF MAKING THE SAME

(71) Applicant: 3M INNOVATIVE PROPERTIES COMPANY, St. Paul, MN (US)

(72) Inventor: Geoffrey P. Morris, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/903,522

(22) PCT Filed: Jul. 3, 2014

(86) PCT No.: PCT/US2014/045417
§ 371 (c)(1),
(2) Date: Jan. 7, 2016

(87) PCT Pub. No.: WO2015/009461
PCT Pub. Date: Jan. 22, 2015

(65) Prior Publication Data
US 2016/0152513 A1 Jun. 2, 2016

Related U.S. Application Data

(60) Provisional application No. 61/934,947, filed on Feb. 3, 2014, provisional application No. 61/847,711, filed on Jul. 18, 2013.

(51) Int. Cl.
| | | |
|---|---|---|
| *C03C 11/00* | (2006.01) | |
| *C03C 3/097* | (2006.01) | |
| *C03B 19/10* | (2006.01) | |
| *C03C 1/00* | (2006.01) | |
| *C03C 3/064* | (2006.01) | |

(52) U.S. Cl.
CPC .......... *C03C 11/002* (2013.01); *C03B 19/107* (2013.01); *C03C 1/002* (2013.01); *C03C 3/064* (2013.01); *C03C 3/097* (2013.01)

(58) Field of Classification Search
CPC ......... C03C 3/089; C03C 3/097; C03C 11/00; C03C 11/002; C03B 19/107
See application file for complete search history.

(56) References Cited

U.S. PATENT DOCUMENTS

| | | | |
|---|---|---|---|
| 3,365,315 A | 1/1968 | Beck | |
| 3,493,403 A | 2/1970 | Tung | |
| 4,391,646 A | 7/1983 | Howell | |
| 4,767,726 A | 8/1988 | Marshall | |
| 4,983,550 A | 1/1991 | Goetz | |
| 5,064,784 A | 11/1991 | Saito | |
| 5,176,732 A * | 1/1993 | Block | C03C 11/002 501/33 |
| 5,217,928 A * | 6/1993 | Goetz | C03C 3/078 501/33 |
| 5,292,690 A | 3/1994 | Kawachi | |
| 5,559,170 A | 9/1996 | Castle | |
| 5,849,055 A | 12/1998 | Arai | |
| 6,254,981 B1 | 7/2001 | Castle | |
| 6,531,222 B1 | 3/2003 | Tanaka | |
| 8,261,577 B2 | 9/2012 | Qi | |
| 9,540,276 B2 * | 1/2017 | Qi | C03C 1/002 |
| 2006/0122049 A1 | 6/2006 | Marshall et al. | |
| 2011/0152057 A1 | 6/2011 | Qi | |
| 2013/0291590 A1* | 11/2013 | Qi | C03C 11/002 65/21.4 |

FOREIGN PATENT DOCUMENTS

| | | |
|---|---|---|
| JP | S59174540 A | 10/1984 |
| WO | WO 2001-66479 | 9/2001 |
| WO | WO 2012-087656 | 6/2012 |
| WO | WO 2012-134679 | 10/2012 |
| WO | WO 2013-184307 | 12/2013 |

OTHER PUBLICATIONS

International Search report for PCT International Application No. PCT/US2014/045417 dated Feb. 2, 2015, 3 pgs.

* cited by examiner

*Primary Examiner* — Elizabeth A. Bolden
(74) *Attorney, Agent, or Firm* — Bradford B. Wright

(57) ABSTRACT

Glass microbubbles include on an average weight basis: from 25.0 to 37.4 percent by weight of silicon; from 5.7 to 8.6 percent by weight of calcium; from 5.2 to 14.9 percent by weight, on a total combined weight basis, of at least one of sodium or potassium; from 0.3 to 0.9 percent of boron; and from 0.9 to 2.6 percent of phosphorus, wherein the weight ratio of phosphorus to boron is in the range of from 1.4 to 4.2, and wherein the glass microbubbles comprise less than 0.4 percent by weight of zinc. A raw product including the glass microbubbles, and methods of making the raw product are also disclosed.

14 Claims, No Drawings

GLASS MICROBUBBLES, RAW PRODUCT, AND METHODS OF MAKING THE SAME

TECHNICAL FIELD

The present disclosure broadly relates to raw product containing glass microbubbles, glass microbubbles, and methods of their manufacture.

BACKGROUND

Glass microbubbles, variously also known in the art as "hollow glass microspheres" or "glass microballoons", typically have low specific gravity, satisfactory heat resistance, heat insulating properties, pressure-resistance (e.g., crush strength) and impact resistance, and may achieve superior physical properties when substituted for conventional fillers. They are used in applications such as molding parts (e.g., including a molding compound for electric household appliances, portable electronic devices and automobiles), putties, sealing materials, a buoyancy material for ships, a synthetic wood, a reinforcing cement outer wall material, a light weight outer wall material, and artificial marble. Also, due to the structure of hollow particles, glass microbubbles may have a low dielectric constant that can be imparted as a bulk property to compositions in which they are contained.

Glass microbubbles can be prepared using a variety of processes and materials. In some cases, the product made from these processes and materials is multi-cellular, weak, not chemically durable, and/or has other limiting characteristics. For some applications, consistently higher quality single-cell glass microbubbles are required. It is particularly desirable to obtain high strength to density ratios.

Glass microbubbles are typically formed by heating glass frit and/or agglomerated oxides and inorganic salts, optionally containing a blowing agent (i.e., also known as a "feed") in a flame, thereby forming glass microbubbles. The microbubbles thus formed, known in the art as "raw product", are typically accompanied by, among other things, unexpanded glass beads and broken glass microbubbles. The raw product may be further processed, for example, by classification and/or flotation to further purify and isolate the glass microbubbles.

Attempts to reduce costs in the glass microbubbles industry while simultaneously achieving acceptable or improved physical properties (e.g., crush strength and/or density) have been for many decades, yet there remains a need for glass compositions and methods with reduced cost and acceptable physical properties.

SUMMARY

Advantageously, the present inventor has discovered improved glass microbubble compositions that need relatively less energy to manufacture (e.g., less than 12000 BTU/lb (27.9 MJ/kg)) than current commercially produced glass microbubbles, thereby reducing manufacturing cost, while achieving acceptable physical properties.

In one aspect, the present disclosure provides glass microbubbles comprising, on an average basis:
 from 25.0 to 37.4 percent by weight of silicon;
 from 5.7 to 8.6 percent by weight of calcium;
 from 5.2 to 14.9 percent by weight, on a total combined weight basis, of at least one of sodium or potassium;
 from 0.3 to 0.9 percent of boron; and
 from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

In another aspect, the present disclosure provides a method of making raw product comprising glass microbubbles. The method comprises heating and expanding feed to provide the raw product, wherein the glass microbubbles comprise, on an average basis:
 from 25.0 to 37.4 percent by weight of silicon;
 from 5.7 to 8.6 percent by weight of calcium;
 from 5.2 to 14.9 percent by weight, on a combined weight basis, of at least one of sodium or potassium;
 from 0.3 to 0.9 percent of boron; and
 from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

In yet another aspect, the present disclosure provides a raw product (preparable, for example, by the preceding method) comprising glass microbubbles and unexpanded glass particles, wherein on an average basis, the raw product comprises:
 from 25.0 to 37.4 percent by weight of silicon;
 from 5.7 to 8.6 percent by weight of calcium;
 from 5.2 to 14.9 percent by weight, on a combined weight basis, of at least one of sodium or potassium;
 from 0.3 to 0.9 percent of boron; and
 from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

In this application:

The term "80 percent crush strength" is determined according to the 80 Percent Crush Strength Test, in the Examples section hereinbelow.

The term "$D_{50}$" refers to that particle diameter at which 50 percent by volume of the particles in a distribution of particles have that diameter or a smaller diameter.

The term "$D_{90}$" refers to that particle diameter at which 90 percent by volume of the particles in a distribution of particles have that diameter or a smaller diameter.

The term "microbubbles" refers to substantially spherical hollow particles, each having a substantially single-cell structure, wherein the particles have a size distribution with a $D_{90}$ is less than 1 millimeter.

The term "theoretical oxide equivalent amount" used in reference to the amount by weight of an element refers to the weight of that element if converted to its specified oxide.

All numerical ranges recited herein are inclusive of their endpoints, unless specifically indicated otherwise. Features and advantages according to the present disclosure will be further understood upon consideration of the detailed description as well as the appended claims.

DETAILED DESCRIPTION

The components of the glass in compositions according to the present disclosure each generally contribute different properties or degrees of a property in proportion to their amount in the composition, and combine with one another to achieve the properties of glass microbubbles according to the present disclosure. The components and amounts of each are chosen to provide compositions that can be manufactured with reduced energy, while still providing acceptably low density and/or high crush strength. Preferably, the components and amounts of each are also chosen to provide compositions with low volatility at the temperatures of operation. Preferably, the glass compositions according to the present disclosure require no additional fluidizing agents for improving fluidity in the melt during the manufacturing process. If fluidizing agents are used, however, they should preferably not be volatile or create hazardous compounds. Thus, metal fluorides are preferably not included in compositions according to the present disclosure.

Silicon, generally present as an oxide (e.g., $SiO_2$) or mixed oxide, promotes glass formation. Too much silica, however, may tend to make glass viscous and difficult to form the molten glass directly into microbubbles without the formation of excessive amounts of odd-shaped particles and fibers. Thus, the glass compositions according to the present disclosure have an average silicon content of from 25.0 to 37.4 percent by weight, preferably from 28.1 to 37.4 percent by weight, more preferably from 30 to 35 percent by weight, and more even preferably from 32 to 33 percent by weight. In terms of theoretical oxide equivalent amounts, this may correspond to 53.5 to 80 percent by weight of $SiO_2$, preferably from 64 to 75 percent by weight of $SiO_2$, and more preferably from 68 to 71 percent by weight of $SiO_2$.

Calcium, generally present as an oxide or salt (e.g., a phosphate salt), is included to improve fluidity of the glass melt during formation of the glass. Thus, the glass compositions according to the present disclosure have an average calcium content of from 5.7 to 8.6 percent by weight, preferably from 6.1 to 8.2 percent by weight, and more preferably, from 6.4 to 7.9 percent by weight. In terms of theoretical oxide equivalent amounts, this may correspond to 8 to 12 percent by weight of CaO, preferably from 8.5 to 11.5 percent by weight of CaO, and more preferably from 9 to 11 percent by weight of CaO.

Alkali metals such as sodium and potassium also promote glass formation. On an average combined weight basis (i.e., adding the weights of Na and K that are present), glass microbubbles comprise from 5.2 to 14.9 percent by weight of at least one of sodium or potassium, preferably from 5.9 to 12.5 percent by weight of at least one of sodium or potassium, and more preferably from 6.7 to 9.1 percent by weight of at least one of sodium or potassium. In terms of theoretical oxide equivalent amounts, this may correspond to 7 to 18 percent by weight of $Na_2O$ and/or $K_2O$, preferably from 8 to 15 percent by weight of $Na_2O$ and/or $K_2O$, and more preferably from 9 to 11 percent by weight of $Na_2O$ and/or $K_2O$. In preferred embodiments, the alkali metal oxide is sodium oxide, rather than potassium oxide, because potassium oxide is more volatile than sodium oxide during typical glass melting operations.

Boron provides improvement in the level of crushing strength and promotes glass formation; however, too much boron can cause manufacturing problems, such as poor melting behavior and phase separation. Thus, the glass compositions according to the present disclosure have an average boron content of from 0.3 to 0.9 percent by weight, preferably from 0.35 to 0.7 percent by weight, and more preferably from 0.4 to 0.6 percent by weight. In terms of theoretical oxide equivalent amounts, this may correspond to 1 to 3 percent by weight of $B_2O_3$, preferably from 1.1 to 2.3 percent by weight of $B_2O_3$, and more preferably from 1.0 to 2.0 percent by weight of $B_2O_3$.

Phosphorus promotes glass formation. Glass microbubbles according to the present disclosure have an average phosphorus content of from 0.9 to 2.6 percent by weight, preferably from 0.95 to 2.5 percent by weight, and more preferably from 1.0 to 2.0 percent by weight. In terms of theoretical oxide equivalent amounts, this may correspond to 2 to 6 percent by weight of $P_2O_5$, preferably from 2.2 to 5.8 percent by weight of $P_2O_5$, and more preferably from 2.3 to 4.6 percent by weight of $P_2O_5$.

Preferably, the phosphorus is included as phosphoric acid, although it may be added as an oxide and/or salt. If included as phosphoric acid, the quantity of acid needed to achieve the required levels of phosphorus in the raw product and/or glass microbubbles typically enables the re-introduction of soluble condensed fume that will be collected in pollution control equipment. The fume contains a large amount of soluble sodium which will form borax crystals if soluble boron species are present which just so happens to also be introduced as part of the condensed fume. It also enables the use of soluble borate salts such as borax. Advantageously, these compositions can also be prepared without the need of an organic binder, which can add complexity and significant additional cost.

In order to achieve the combined properties of low energy requirements for manufacturing and acceptable crush strength, the average weight ratio of phosphorus to boron is in the range of from 1.4 to 4.2, preferably in the range of from 1.6 to 4.0, and more preferably in the range of from 1.8 to 2.5. In terms of theoretical oxide equivalent amounts, this may correspond to weight ratios of $P_2O_5/B_2O_3$ in a range of from 1 to 3, preferably in a range of from 1.1 to 2.9, and more preferably in a range of from 1.3 to 1.8.

The above glass compositions are advantageous because they can be readily formed into glass microbubbles without the use of additional fluidizing agents. Commonly used fluidizing agents are metal fluorides (e.g., NaF, LiF, $BaF_2$, KF), which can create hazardous emissions from the glass melt in the form of volatile HF and $SiF_4$. The presence of fluorine, a non-bridging anion, also promotes devitrification which limits the size of glass microbubbles that can be prepared from the compositions according to the present disclosure.

Other components may be included in the glass microbubbles; typically, to contribute some specific property. Generally, these other components do not total more than about 5 percent by weight, preferably not more than about 2 percent by weight, and more preferably no more than about 0.5 percent by weight of the glass microbubbles (theoretical oxide equivalent basis). Zinc (e.g., as ZnO) is an example of one possible additional component which can be added to provide meltability and fluidity to the glass melt; however, it also appears to reduce crush strength. Thus, if zinc is present, it is present in an amount of no more than 0.4 percent by weight, preferably less than 0.3 percent by weight, more preferably less than 0.2 percent by weight, more preferably less than 0.1 percent by weight, and more preferably less than 0.01 percent by weight. In some embodiments, the glass microbubbles are free of zinc.

Colorants can also be included in the glass microbubbles. Such colorants include, for example, $CeO_2$, $Fe_2O_3$, CoO, $Cr_2O_3$, NiO, CuO, and $MnO_2$. Typically, the glass compositions according to the present disclosure include no more than about 5 percent by weight, preferably no more than about 1 percent by weight, of colorant, based on the total weight of the composition (theoretical equivalent oxide basis). Also, rare earth elements, such as europium, can be included for fluorescence.

Glass microbubbles according to the present disclosure can be prepared, for example, by various processes. For example, one process of making glass microbubbles includes simultaneous fusion of glass-forming components and expansion of the fused mass. In another process, a glass composition containing an inorganic gas forming agent, or blowing agent, is heated to a temperature sufficient to liberate the blowing agent. Yet another process includes pulverizing a material by wet pulverization to obtain a slurry of a pulverized powder material, spraying the slurry to form liquid droplets, and heating the liquid droplets to fuse or sinter the powder material in order to obtain inorganic glass microbubbles. In still another process, low density glass microbubbles may be produced by processing precisely formulated feed mixtures in an entrained flow reactor under partially oxidizing conditions with a carefully controlled time-temperature history.

In one useful process, the feed comprises glass precursor materials (e.g., recycled glass frit; inorganic oxides of Si, Ca, Na, K, B, P, or other elements; and/or inorganic salts comprising Si, Ca, Na, K, B, P, or other elements), which may be measured out in particulate form, each starting material being preferably about 0.01 and 50 micrometers in size, are intimately mixed together to form agglomerates.

The feed may comprise at least one of recycled glass, silica sand, volcanic ash, perlite, fluorite, obsidian, silica gel, zeolite, bentonite, soda ash, borax, boric acid, zinc flour, lime, $Ca_3(PO_4)_2$, $Na_2SO_4$, $Na_4P_2O_7$, $Al_2O_3$, a compound or a salt which derives a glass-forming component such as $SiO_2$, $B_2O_3$ or $Na_2O$, or a combination thereof. Feed useful in the present disclosure may be prepared, for example, by crushing and/or milling the combined desired components. In some embodiments, the feed contains recycled glass particles blended with other types of suitable components, such as, for example, other types of suitable glasses and/or individual oxide components.

The composition of the feed may be the same as, or more typically different from, the composition of the raw product and/or glass microbubbles. Generally the differences are due to volatilization of components in the feed that may occur during heating. Selection of appropriate compositions to use in the feed to achieve the desired compositions of the raw product and/or glass microbubbles is within the capability of one of ordinary skill in the art.

Optionally, the feed may further comprise one or more blowing agents. Blowing agents are also sometimes referred to as foaming agents or expanding agents. If present, the blowing agent is typically present in the feed in an amount greater than about 0.1 weight percent (e.g., at least 0.2 weight percent, 0.3 weight percent, 0.4 weight percent, or even at least 0.5 weight percent) based on the total weight of the feed. If sulfur compounds are used, they are typically present in an amount of from 1000 to 4000 parts per million by weight of sulfur.

Structurally or chemically bound water (e.g., hydrated minerals) may be used as a blowing agent; however, when using relatively higher melting glass compositions, structurally/chemically bound water may be removed too early in the process to be an effective blowing agent. The use of blowing agents that are not effective blowing agents may produce malformed bubbles and/or solid beads. As a result, not all compounds or components that liberate gas are effective blowing agents for the purpose of forming high quality hollow glass microbubbles. Effective blowing agents release gas at a specific rate and temperature to interact with the molten glass and create hollow cavities therein, thus forming glass microbubbles. Examples of effective blowing agents include sulfur oxides such as, for example, sulfates and sulfites. Examples of useful sulfates include metal sulfates (e.g., zinc sulfate, sodium sulfate, potassium sulfate, lithium sulfate, rubidium sulfate, magnesium sulfate, calcium sulfate, barium sulfate, and lead sulfate). Other blowing agents, such as $CO_2$, $O_2$, or $N_2$ may be included in addition to the sulfur oxides; in fact, oxygen is quite commonly present as a residue from a sulfate ion. Glass microbubbles according to the present disclosure can be filled with gaseous materials after formation, but such fills are not considered in describing the amounts of ingredients in the microbubbles. Additional blowing agents include carbonate compounds.

Additional ingredients can be included in the feed, for example, to contribute particular properties or characteristics (e.g., hardness or color) to the resultant glass microbubbles. The feed may optionally contain an inorganic or organic binder material, but this is not a requirement.

The feed may be prepared, for example, by forming an aqueous composition comprising the component materials (e.g., recycled glass particles, inorganic oxide particles, inorganic salt particles, and an optional blowing agent) and spray drying the aqueous composition.

In some embodiments, the feed can be produced by combining a primary component, and optionally, a binding agent (binder) in an aqueous composition (e.g., an aqueous dispersion or slurry). In addition to water, the aqueous composition may further comprise water-soluble organic solvents such as, for example, organic ethers (e.g., diglyme, glyme, or dioxane), ketones (e.g., acetone), amides (e.g., N-vinylpyrrolidinone or N,N-dimethylacetamide), and/or alcohols (e.g., methanol, ethanol, or propanol).

Binding agents useful in the present disclosure are useful to intimately bind individual particles in the feed as agglomerates. Exemplary binding agents useful in the present disclosure include sugar, starch, and carboxymethyl cellulose commercially available as CELLULOSE GUM from Ashland Inc., Covington, Ky. The aqueous composition is then dried to produce the feed, which is generally a substantially solid agglomerate mixture of its constituent materials.

Typically, the mixing step provides an aqueous composition, which is later dried. Mixing can be performed by any conventional means used to blend ceramic powders. Examples of suitable mixing techniques include, but are not limited to, agitated tanks, ball mills, single and twin screw mixers, and attrition mills. Certain mixing aids such as, surfactants may be added in the mixing step, as appropriate. Surfactants, for example, may be used to assist with mixing, suspending and dispersing the particles.

Drying is typically performed at a temperature in the range of about 30° C. to 300° C. Any type of dryer customarily used in industry to dry slurries and pastes may be used. In some embodiments, drying may be performed in a spray dryer, fluid bed dryer, rotary dryer, rotating tray dryer, pan dryer, or flash dryer. Desirably, drying is performed using a spray dryer. Spray dryers are well-known to those of ordinary skill in the art.

In addition to the aforementioned advantages, it is generally desirable to synthesize glass microbubbles having a predetermined average particle size and a predetermined, typically narrow, particle size distribution. The use of a spray dryer in certain embodiments according to the present disclosure has been found to reduce the need for any sizing/classification of the feeds or, ultimately, the glass microbubbles. Spray drying has the additional advantage of allowing a high throughput of material and fast drying times. Hence, in certain embodiments according to the present disclosure, the drying step is performed using a spray dryer.

Particle size and particle size distribution can be affected by one or more of the following parameters in the spray drying process: design of the atomizer (rotary atomizer, pressure nozzle, two fluid nozzle, or the like); inlet slurry pressure and velocity (particle size tends to decrease with increasing pressure); design of the gas inlet nozzle; volume flow rate and flow pattern of gas; slurry viscosity, slurry percent solids and effective slurry surface tension. Desirably, the aqueous composition feeding the spray dryer comprises about 25 to 70 weight percent solids, or from about 40 to 60 weight percent of solids.

In addition to the ingredients described above, the aqueous composition may contain further processing aids or additives to improve mixing, flowability, or droplet formation in the spray dryer. Suitable additives are well known in the spray drying art.

In the spray drying process, the aqueous composition is typically pumped to an atomizer at a predetermined pressure and temperature to form slurry droplets. The atomizer may be one or a combination of the following: an atomizer based on a rotary atomizer (centrifugal atomization), a pressure nozzle (hydraulic atomization), or a two-fluid pressure nozzle where the slurry is mixed with another fluid (pneumatic atomization).

In order to ensure that the droplets formed are of a proper size, the atomizer may also be subjected to cyclic mechanical or sonic pulses. The atomization may be performed from the top or from the bottom of the dryer chamber. The hot drying gas may be injected into the dryer co-current or counter-current to the direction of the spraying.

By controlling the spray drying conditions, the average particle size of the feeds and the feed particle size distribution can be controlled. For example, a rotary atomizer can be used to produce a more uniform agglomerate particle size distribution than a pressure nozzle. Furthermore, rotating atomizers allow higher feed rates, suitable for abrasive materials, with negligible blockage or clogging. In some embodiments, a hybrid of known atomizing techniques may be used in order to achieve agglomerate feeds having the desired characteristics.

The atomized droplets of slurry are dried in the spray dryer for a predetermined residence time. The residence time can affect the average particle size, the particle size distribution and the moisture content of the resultant feeds. The residence time is typically controlled to give the desired characteristics of the feed, as described above. The residence time can be controlled by the water content of the slurry, the slurry droplet size (total surface area), the drying gas inlet temperature and gas flow pattern within the spray dryer, and the particle flow path within the spray dryer. Desirably, the inlet temperature in the spray dryer is in the range of about 120 to 500° C. and the outlet temperature is in the range of about 90° C. to 150° C.

Desirably, the feed particles have a $D_{50}$ in the range of from 5 to 150 microns, more desirably from 6 to 100 microns, more desirably from 8 to 50 microns, and even more desirably from about 10 to 30 microns. The particle size of the feed will be related to the particle size of the resultant glass microbubble, although the degree of correspondence will, of course, only be approximate. If necessary, standard comminuting/sizing/classification techniques may be employed to achieve a desired average particle size.

The feed is fed into a heat source (e.g., a natural gas/air or natural gas/air/oxygen flame) to produce a raw product containing glass microbubbles. The flame may be neutral, reducing or oxidizing. The natural gas/air and/or natural gas/air/oxygen ratio may be adjusted to yield glass microbubbles of varying densities and strengths. The feed is heated to a temperature that fuses the feed into a melt, reduces the viscosity of the melt, seals the surface of the feed and promotes expansive formation of gas within the melt to form raw product containing the glass microbubbles. The heating temperature should also desirably maintain the melt at a temperature and time sufficient to allow the internal bubbles to coalesce and form a single primary internal void within the molten glass microbubbles. The resulting raw product comprising glass microbubbles, fibers, and unexpanded glass particles is then cooled and recovered, for example, according to conventional techniques. Methods generally suitable for heating agglomerate feed to form glass microbubbles are described, for example, in U.S. Pat. Appln. Publ. No. 2011/0152057 A1 (Qi), and U.S. Pat. No. 3,493,403 (Tung et al.) and U.S. Pat. No. 6,027,799 (Castle).

Raw product and/or glass microbubbles prepared according to the present disclosure advantageously typically have relatively low true density; for example, the true density may be less than 0.7 gram/cubic centimeter ($g/cm^3$). In some embodiments, the raw product and/or glass microbubbles have a true density of less than 0.6 $g/cm^3$, or even less than 0.5 $g/cm^3$.

Glass microbubbles according to the present disclosure typically have acceptable crush strengths. For example, they may have an 80 percent crush strength (as defined hereinabove) of at least 1600 pounds per square inch (psi, 11.0 MPa). In some embodiments, glass microbubbles according to the present disclosure have an 80 percent crush strength of at least 3500 psi (24.1 MPa). In some embodiments, glass microbubbles according to the present disclosure have an 80 percent crush strength of at least 4000 psi (25.6 MPa). In some embodiments, glass microbubbles according to the present disclosure have an 80 percent crush strength of at least 4500 psi (31.0 MPa).

Glass microbubbles according to the present disclosure have substantially single cell structures. The term "substantially" as used herein means that the majority of the glass microbubbles according to the present disclosure have single cell structures. The term "single cell structure" as used herein means that each glass microbubble is defined by a single outer wall with no additional exterior walls, partial spheres, concentric spheres, or the like present in each individual glass microbubble.

Raw product and/or glass microbubbles according to the present disclosure may be isolated within in a containment vessel such as, for example, a box, bucket, or bag, although this is not a requirement.

Raw product and/or glass microbubbles according to the present disclosure may have a mean particle diameter ($D_{50}$) of less than 200 microns, less than 150 microns, less than 100 microns, or even less than 50 microns. Glass particles comprising glass microbubbles with a $D_{50}$ of less than 200 microns have utility for many purposes, some of which require certain size, shape, density, and/or strength characteristics. For example, glass microbubbles are widely used in industry as additives to polymeric compounds where they may serve as modifiers, enhancers, rigidifiers, and/or fillers. Generally, it is desirable that the glass microbubbles be strong to avoid being crushed or broken during further processing of the polymeric compound, such as by high pressure spraying, kneading, extrusion or injection molding. For many applications, it is also desirable to provide low density glass microbubbles, for example, in applications wherein weight is an important factor.

Raw product and/or glass microbubbles according to the present disclosure may be used in a wide variety of applications, for example, in filler applications, modifier applications, containment applications or substrate applications. For example, raw product and/or glass microbubbles according to the present disclosure may be used as filler in composite materials, where they impart properties of cost reduction, weight reduction, improved processing, performance enhancement, improved machinability and/or improved workability. More specifically, they may be used as fillers in polymers (including thermoset, thermoplastic, and inorganic geopolymers), inorganic cementitious materials (including material comprising Portland cement, lime cement, alumina-based cements, plaster, phosphate-based cements, magnesia-based cements and other hydraulically settable binders), concrete systems (e.g., precise concrete structures, tilt up concrete panels, columns, or suspended concrete structures), putties (e.g., for void filling and/or patching applications), wood composites (e.g., particleboards, fiberboards, wood/polymer composites, and other composite wood structures), clays, and ceramics. One particularly useful application is in fiber cement building products.

Raw product and/or glass microbubbles according to the present disclosure may also be used as modifiers in combination with other materials. By appropriate selection of size and geometry, glass particles may be combined with certain materials to provide unique characteristics such as, for example, increased film thickness, improved distribution, and/or improved flowability. Typical modifier applications include light reflecting applications (e.g., highway markers and signs), industrial explosives, blast energy absorbing structures (e.g., for absorbing the energy of bombs and explosives), paints and powder coating applications, grinding and blasting applications, earth drilling applications (e.g., cements for oil well drilling), adhesive formulations and acoustic or thermal insulating applications.

Glass microbubbles may be used to contain and/or store other materials. Typical containment applications include medical and medicinal applications (e.g., microcontainers for drugs), micro-containment for radioactive or toxic materials, and micro-containment for gases and liquids.

Raw product and/or glass microbubbles may also be used in to provide specific surface activities in various applications where surface reactions are used such as substrate applications. Surface activities may be further improved by subjecting the raw product and/or glass microbubbles to secondary treatments, such as, for example, metal or ceramic coating, and/or acid leaching. Typical substrate applications include ion exchange applications for removing contaminants from fluid, catalytic applications in which the surface of the microbubbles is treated to serve as a catalyst in synthetic, conversion or decomposition reactions, filtration where contaminants are removed from gas or liquid streams, conductive fillers or RF shielding fillers for polymer composites, and medical imaging.

Raw product and/or glass microbubbles according to the present disclosure are loosely packed assemblages of particles. By the term "loosely-packed" it is meant that the glass particles are in close proximity (typically in contact with other glass particle(s), however this is not a requirement) and substantially free-flowing. Loosely packed particles may be confined within a container such as, for example, a bag, a box, or a drum.

While glass microbubbles according to the present disclosure are ordinary handled in loosely-packed form, they may also be tightly-packed (i.e., in the absence of any binding material, the glass microbubbles by themselves do not flow freely).

Select Embodiments According to the Present Disclosure

In a first embodiment, the present disclosure provides glass microbubbles comprising, on an average basis:

from 25.0 to 37.4 percent by weight of silicon;
from 5.7 to 8.6 percent by weight of calcium;
from 5.2 to 14.9 percent by weight, on a total combined weight basis, of at least one of sodium or potassium;
from 0.3 to 0.9 percent of boron; and
from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

In a second embodiment, the present disclosure provides glass microbubbles according to the first embodiment, comprising from 25.0 to 28.1 percent by weight of silicon.

In a third embodiment, the present disclosure provides glass microbubbles according to the first embodiment, comprising from 28.1 to 37.4 percent by weight of silicon.

In a fourth embodiment, the present disclosure provides glass microbubbles according to any one of the first to third embodiments, comprising from 6.4 to 7.9 percent by weight of calcium.

In a fifth embodiment, the present disclosure provides glass microbubbles according to any one of the first to fourth embodiments, comprising, on a total combined weight basis, from 6.7 to 9.1 percent by weight of at least one of sodium or potassium.

In a sixth embodiment, the present disclosure provides glass microbubbles according to any one of the first to fifth embodiments, comprising from 0.4 to 0.6 percent by weight of boron.

In a seventh embodiment, the present disclosure provides glass microbubbles according to any one of the first to sixth embodiments, comprising from 1.0 to 2.0 percent by weight of phosphorus.

In an eighth embodiment, the present disclosure provides glass microbubbles according to any one of the first to seventh embodiments, wherein the weight ratio of phosphorus to boron is in the range of from 1.8 to 2.5.

In a ninth embodiment, the present disclosure provides glass microbubbles according to any one of the first to eighth embodiments, comprising less than 0.01 percent by weight of zinc.

In a tenth embodiment, the present disclosure provides glass microbubbles according to any one of the first to ninth embodiments, wherein the glass microbubbles have a true density of less than 0.7 g/cm$^3$.

In an eleventh embodiment, the present disclosure provides a method of making raw product comprising glass microbubbles, the method comprising heating and expanding feed to provide the raw product, wherein the glass microbubbles comprise, on an average basis:

from 25.0 to 37.4 percent by weight of silicon;
from 5.7 to 8.6 percent by weight of calcium;
from 5.2 to 14.9 percent by weight, on a combined weight basis, of at least one of sodium or potassium;
from 0.3 to 0.9 percent of boron; and
from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

In a twelfth embodiment, the present disclosure provides a method according to the eleventh embodiment, wherein the glass microbubbles comprise from 25.0 to 28.1 percent by weight of silicon.

In a thirteenth embodiment, the present disclosure provides a method according to the eleventh embodiment, wherein the glass microbubbles comprise from 28.1 to 37.4 percent by weight of silicon.

In a fourteenth embodiment, the present disclosure provides a method according to any one of the eleventh to thirteenth embodiments, wherein the glass microbubbles comprise from 6.4 to 7.9 percent by weight of calcium.

In a fifteenth embodiment, the present disclosure provides a method according to any one of the eleventh to fourteenth embodiments, wherein the glass microbubbles comprise, on a total combined weight basis, from 6.7 to 9.1 percent of at least one of sodium or potassium.

In a sixteenth embodiment, the present disclosure provides a method according to any one of the eleventh to fifteenth embodiments, wherein the glass microbubbles comprise from 0.4 to 0.6 percent by weight of boron.

In a seventeenth embodiment, the present disclosure provides a method according to any one of the eleventh to sixteenth embodiments, wherein the glass microbubbles comprise from 1.0 to 2.0 percent by weight of phosphorus.

In an eighteenth embodiment, the present disclosure provides a method according to any one of the eleventh to seventeenth embodiments, wherein the weight ratio of phosphorus to boron in the glass microbubbles is in the range of from 1.8 to 2.5.

In a nineteenth embodiment, the present disclosure provides a method according to any one of the eleventh to eighteenth embodiments, wherein the glass microbubbles comprise less than 0.01 percent by weight of zinc.

In a twentieth embodiment, the present disclosure provides a method according to any one of the eleventh to nineteenth embodiments, wherein the glass microbubbles have a true density of less than 0.7 g/cm$^3$.

In a twenty-first embodiment, the present disclosure provides a method according to any one of the eleventh to sixteenth embodiments, further comprising separating at least a portion of the glass microbubbles from the raw product.

In a twenty-second embodiment, the present disclosure provides a raw product comprising glass microbubbles and unexpanded glass particles, wherein on an average basis, the
raw product comprises from 25.0 to 37.4 percent by weight of silicon;
from 5.7 to 8.6 percent by weight of calcium;
from 5.2 to 14.9 percent by weight, on a combined weight basis, of at least one of sodium or potassium;
from 0.3 to 0.9 percent of boron; and
from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

In a twenty-third embodiment, the present disclosure provides a raw product according to the twenty-second embodiment, wherein the glass microbubbles comprise from 25.0 to 28.1 percent by weight of silicon.

In a twenty-fourth embodiment, the present disclosure provides a raw product according to the twenty-second embodiment, comprising from 28.1 to 37.4 percent by weight of silicon.

In a twenty-fifth embodiment, the present disclosure provides a raw product according to any one of the twenty-second to twenty-fourth embodiments, comprising from 6.4 to 7.9 percent by weight of calcium.

In a twenty-sixth embodiment, the present disclosure provides a raw product according to any one of the twenty-second to twenty-fifth embodiments, comprising, on a total combined weight basis, from 6.7 to 9.1 percent of at least one of sodium or potassium.

In a twenty-seventh embodiment, the present disclosure provides a raw product according to any one of the twenty-second to twenty-sixth embodiments, comprising from 0.4 to 0.6 percent by weight of boron.

In a twenty-eighth embodiment, the present disclosure provides a raw product according to any one of the twenty-second to twenty-seventh embodiments, comprising from 1.0 to 2.0 percent by weight of phosphorus.

In a twenty-ninth embodiment, the present disclosure provides a raw product according to any one of the twenty-second to twenty-eighth embodiments, wherein the weight ratio of phosphorus to boron is in the range of from 1.8 to 2.5.

In a thirtieth embodiment, the present disclosure provides a raw product according to any one of the twenty-second to twenty-ninth embodiments, comprising less than 0.01 percent by weight of zinc.

In a thirty-first embodiment, the present disclosure provides a raw product according to according to any one of the twenty-second to thirtieth embodiments, wherein the raw product has a true density of less than 0.7 g/cm$^3$.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. On the Examples, "EX"=Example; "CE"=Comparative Example; "NM"=not measured; "BTU"=British Thermal Units; "min"=minutes; "scf"=standard cubic feet; "g"=grams; "w/w"=by weight; "CFM"=cubic feet/minute; "SLM"=standard liters/minute, "in"=inch(es); "sec"=second(s), "mL"=milliliters; "mg"=milligrams; "MPa"=megapascals, "J"=joules.

Test Methods

Average Particle Density Determination

A fully automated gas displacement pycnometer obtained as ACCUPYC 1330 PYCNOMETER from Micromeritics, Norcross, Ga., was used to determine the density of microspheres according to ASTM UOP 851-08 "Density of Powders and Solids by Helium Displacement" with exceptions. Dry compressed air was used as the analysis gas.

Particle Size Distribution Determination

Particle size distribution was determined using a COULTER LS 13 320 MW particle size analyzer equipped with a Tornado dry powder system from Beckman Coulter Inc., Brea, Calif. Data was analyzed using the "glass" optical model supplied by Beckman Coulter Inc. Results are reported as $D_{50}$ which refers to the median particle size of the distribution.

Milled Glass Slurry Primary Particle Size Determination

The milled glass slurry's primary particle size was measured with either a "SATURN DIGISIZER 5200 or 5205 from Micromeritics Instrument Corporation, Norcross, Ga. using water as the carrier medium. Data was analyzed using a scattering model that assumes a real index of refraction of 1.52 and an imaginary value of 0.316 and was truncated at 18.9 degrees for final analysis when the 5200 was used and at 21 degree when using the 5205. Samples were prepared by taking between 0.1 and 0.2 g of the milled slurry and diluting it with 150 ml of deionized water. The sample was further ultrasonically agitated for five minutes, at 75% power, using a QSONICA Q-700-110 SONICATOR equipped with the 12.5 mm (0.5 in) ultrasonic probe. The entire sample was added to the analyzer and was subsequently diluted with deionized water, which has been allowed to sit at ambient conditions for a minimum of 12 hours to de-aerate, to obtain an obscuration of between 13 and 15%. Deionized water which had been allowed to sit at ambient conditions for a minimum of 12 hours was used as the analysis liquid. During the analysis cycle the Saturn ultrasonically dispersed the samples for an additional 30 sec at 60% power prior to collecting the diffraction pattern.

80 Percent Crush Strength Test

The strength of glass microbubbles (equivalent to hollow glass microspheres) was measured using ASTM Test Method D3102-78 (1982); "DETERMINATION OF ISO-STATIC COLLAPSE STRENGTH OF HOLLOW GLASS MICROSPHERES" with exceptions. The sample size of hollow microspheres was 10 mL, the hollow microspheres were dispersed in glycerol (20.6 g), and data reduction was automated using computer software. The 80 percent crush strength value reported herein is the isostatic pressure at which 20 percent by volume of the glass microbubbles collapse.

Chemical Analysis of Raw Product Containing Hollow Glass Microspheres 40 mg of sample was weighed to the nearest 0.1 mg into polypropylene 50-ml centrifuge tubes. The samples were dissolved in 4 mL of 2.5% aqueous mannitol, 3 mL of concentrated hydrochloric acid, 1.5 mL concentrated nitric acid and 0.5 mL of concentrated HF. After dissolution the samples were brought to 50 mL with deionized water. The instrument used for elemental analysis was either a Perkin Elmer Optima 8300DV ICP or Optima 7300 ICP optical emission spectrophotometer. The sample was analyzed against external calibration curves generated using acid-matched solution standards containing 0, 0.25, 0.50, and 1.0 ppm (parts per million by weight) of each analyte. A 0.5 ppm quality-control standard was used to monitor the accuracy of the calibration curves during the analysis. A 0.5 ppm solution of scandium was run in-line with the samples and standards to serve as an internal standard. The elements screened during this analysis included Al, B, Ca, K, Mg, Na, P, Si, Zn and Zr. The ppm values reported are averages of two replicates of each sample.

Table 9 reports results of elemental analysis of Comparative Examples A-E and Examples 1 to 6.

Materials

Tricolored recycled glass, milled to −100 mesh, was obtained from Strategic Materials Inc., Texas, USA and LVH Industries, Inc, McAdoo, Pa. 75% Technical grade phosphoric acid was obtained from Innophos, Cranbury, N.J. Technical grade boric acid was obtained from US Borax, Greenwood Village, Colo. Anhydrous sodium sulfate was obtained from Saltex LLC, Fort Worth, Tex. Sodium carbonate, BDH Brand ACS grade was obtained from VWR, Radnor, Pa. Sodium carboxymethyl cellulose grade 7LC, was obtained from Ashland, Inc., Covington, Ky.

Example 1

Tricolored recycled glass (2000 g) from Strategic Materials Inc. was combined with 187 g of technical grade boric acid, 2000 g of tap water, 251 g of 75 percent by weight technical grade phosphoric acid, and 20 g of anhydrous sodium sulfate. The mixture was ball-milled for 48 hr using a 2-gallon (7.6-liter) porcelain ball mill (available from US Stoneware, East Palestine, Ohio) spinning at 70% of critical speed. The mill was filled with 40 lbs (18 kg) of 0.25 in (6 mm) end radius Mg-stabilized zirconia grinding cylinders from Zircoa, Solon, Ohio. The milled mixture had a $D_{50}$ particle size of 1.5 microns.

A portion of the milled mixture was spray dried using a GEA Process equipment Mobile Minor 2000 Model E spray dryer equipped with a Type TS-Minor M02/A atomizer drive and using the 24 slot-vaned rotary atomizer wheel (GEA part #010084-001) spinning at maximum air pressure (6 bar (0.6 MPa)) and an inlet temperature of 350° C. A peristaltic pump was used to feed the slurry to the atomizer drive and was set to maintain an outlet temperature at 100° C. The resulting spray dried powder collected from the cyclone had a $D_{50}$ of 31.3 microns.

The spray dried powder was converted into hollow glass microspheres by feeding it through an air/gas pre-mix burner fueled with a mixture of natural gas, air and oxygen. The powder was fed to the burner through a port that aspirates the feed with some room air as shown in U.S. Pat. No. 6,027,799 (Castle). The amount of aspirated air varies depending on feed rate which was held as constant as possible. Air was blown counter-current to the flame front and was introduced at a distance of 5 in from the end of the air/gas burner at a flow rate of 8.9 CFM (250 liters/min). The feed was introduced for 1.5 min and after allowing an additional two min, during which no feed was introduced to the burner, the resulting microbubbles were collected in a cyclone separator from the exhaust stream and analyzed. Measured air flow rate was 240 SLM, oxygen flow rate of 5 SLM and natural gas flow rate of 30 SLM. The BTU/lb reported below was calculated based on the BTUs used while the bubbles were being formed in the flame, assuming 1000 BTU/SCF (38 kJ/liter) of natural gas, divided by the mass of material collected from the cyclone separator. It is believed that the amount of air intentionally introduced, along with the aspirated air and the added oxygen resulted in enough total oxygen present to react completely with the natural gas (i.e., in a stoichiometric ratio) and the oxygen concentration in the combustion gas being 23 percent by volume.

The flame conditions along with the density, $D_{50}$, 80% crush strength, and chemical composition of the resulting raw hollow glass microspheres collected are reported in Table 1 (below).

TABLE 1

| Energy Usage, BTU/lb (J/g) | True Density, g/cm³ | $D_{50}$, microns | 80% CRUSH STRENGTH psi (MPa) | P/B ratio (w/w) in starting materials | P/B RATIO (w/w) in hollow glass microspheres |
|---|---|---|---|---|---|
| 29440 (68477) | 0.60 | 38.1 | 3455 (23.8) | 1.8 | 3.24 |

Comparative Examples A-C and Example 2

The components in Table 2 were combined and the mixture milled with a Netzsch LABSTAR (available from Netzsch Inc., Exton, Pa.) stirred media mill equipped with a polyurethane RS style agitator, zirconia barrel and floor and filled with 480 ml of 1 mm Zircoa Mill Mates plus beads (available from Zircoa Inc., Cleveland, Ohio). The pump rate was maintained at approximately 0.8 liter/minute through the mill. The milling time and resulting primary particle size of the slurry are given in Table 3. Recycled glass from Strategic Materials Inc. was employed.

A portion of each milled mixture was spray dried as described in Example 1. Table 3 lists the $D_{50}$ particle size of the resulting powder.

The spray dried powder was then fed through an air/gas pre-mix burner fueled with a mixture of natural gas, air and oxygen as described in Example 1.

The flame conditions along with the density, $D_{50}$, 80% crush strength, and chemical composition of the resulting raw hollow glass microspheres collected are reported in Table 4.

TABLE 2

| EXAMPLE | RECYCLED GLASS, g | Na$_2$SO$_4$, g | BORIC ACID, g | WATER, g | 75% PHOSPHORIC ACID, g | Na$_2$CO$_3$, g | P/B RATIO (w/w) in starting materials |
|---|---|---|---|---|---|---|---|
| CE A | 2000 | 15 | 372 | 4500 | 0 | 0 | All B |
| CE B | 2000 | 15 | 372 | 4500 | 125 | 0 | 0.5 |
| EX 2 | 2000 | 15 | 187 | 4500 | 251 | 0 | 1.8 |
| CE C | 1500 | 25 | 0 | 3000 | 266 | 50 | All P |

TABLE 3

| EXAMPLE | AVERAGE POWER, kW | MILLING TIME, hrs | MILLED D$_{50}$ PRIMARY PARTICLE SIZE, microns | SPRAY DRIED D$_{50}$ PRIMARY PARTICLE SIZE, microns |
|---|---|---|---|---|
| CE A | 2.7 | 1.0 | 1.38 | 25.3 |
| CE B | 2.7 | 1.0 | 1.42 | 25.5 |
| EX 2 | 2.7 | 1.0 | 1.40 | 24.6 |
| CE C | 2.8 | 1.5 | 0.97 | 24.8 |

TABLE 4

| EXAMPLE | ENERGY USAGE, BTU/lb (J/g) | TRUE DENSITY, g/cm$^3$ | D$_{50}$, microns | 80% CRUSH STRENGTH, psi (MPa) | P/B RATIO (w/w) in starting materials | P/B RATIO (w/w) in hollow glass microspheres |
|---|---|---|---|---|---|---|
| CE A | 31720 (73908) | 0.73 | 32.7 | 1816 (12.52) | All B | NM |
| CE B | 30160 (70273) | 0.48 | 37.3 | 3617 (24.94) | 0.5 | 0.85 |
| EX 2 | 19194 (44722) | 0.62 | 32.0 | 7239 (49.91) | 1.8 | 1.98 |
| CE C | 29214 (68069) | 0.98 | 29.6 | NM | All P | NM |

Comparative Examples D-E and Examples 3-6

The components in Table 5 were combined and milled as described in COMPARATIVE EXAMPLES A-C and EXAMPLE 2.

The milling time and resulting primary particle size of the slurry are given in Table 6. Recycled glass from LVH Industries Inc. was employed in COMPARATIVE EXAMPLES D-E and EXAMPLES 3-5 and Strategic Materials Inc. in EXAMPLE 6. To prepare EX4 and CEE a portion of EX3 slurry was mixed together with the components listed in Table 5 using a Cowles type dissolver.

A portion of each milled mixture was spray dried as described in Example 1. Table 6 lists the D$_{50}$ particle size of the resulting powder.

The spray dried powder was then fed through an air/gas pre-mix burner fueled with a mixture of natural gas, air and oxygen as described in Example 1.

The flame conditions along with the density, D$_{50}$, 80% crush strength and chemical composition of the resulting raw hollow glass microspheres collected are reported in Table 7.

TABLE 5

| EXAMPLE | RECYCLED GLASS, g | Na$_2$SO$_4$, g | BORIC ACID, g | WATER, g | 75% PHOSPHORIC ACID, g | Na$_2$CO3, g | Carboxy-methyl cellulose g | EX3 SLURRY g | P/B RATIO (w/w) in starting materials |
|---|---|---|---|---|---|---|---|---|---|
| CE D | 1000 | 10 | 47 | 2200 | 251 | 0 | 0 | 0 | 7.3 |
| EX 3 | 3000 | 23 | 280 | 3000 | 376 | 0 | 0 | 0 | 1.8 |
| EX 4 | 0 | 0 | 0 | 0 | 0 | 10 | 0 | 1000 | 1.8 |
| CE E | 0 | 0 | 0 | 0 | 65 | 0 | 0 | 1000 | 3.9 |
| EX 5 | 2000 | 14 | 180 | 2500 | 200 | 0 | 20 | 0 | 1.5 |
| EX 6 | 2000 | 14 | 180 | 2500 | 200 | 0 | 20 | 0 | 1.5 |

TABLE 6

| EXAMPLE | AVERAGE POWER, kW | MILLING TIME, hr | MILLED D$_{50}$ PRIMARY PARTICLE SIZE, microns | SPRAY-DRIED D$_{50}$ PRIMARY PARTICLE SIZE, microns |
|---|---|---|---|---|
| CE D | 2.7 | 0.8 | 1.40 | 24.5 |
| EX 3 | 2.8 | 1.8 | 1.60 | 32.9 |
| EX 4 | 2.8 | 1.8 | 1.60 | 32.4 |
| CE E | 2.8 | 1.8 | 1.60 | 32.4 |
| EX 5 | 2.6 | 1.3 | 1.42 | 30.4 |
| EX 6 | 2.6 | 1.3 | 1.37 | 30.4 |

TABLE 7

| EXAMPLE | ENERGY USAGE, BTU/lb (J/kg) | TRUE DENSITY, g/cm$^3$ | BUBBLE D$_{50}$, microns | 80% CRUSH STRENGTH, psi, (MPa) | P/B RATIO (w/w) in starting materials | P/B RATIO (w/w) in hollow glass microspheres |
|---|---|---|---|---|---|---|
| CE D | 33299 (77587) | 0.87 | 27.2 | NM | 7.3 | 7.1 |
| EX 3 | 30663 (71445) | 0.50 | 44.8 | 1623 (11.19) | 1.8 | 2.8 |
| EX 4 | 30284 (70562) | 0.46 | 44.2 | 2163 (14.91) | 1.8 | 2.5 |
| CE E | 29915 (69702) | 1.08 | 36.1 | NM | 3.9 | 4.6 |
| EX 5 | 30049 (70014) | 0.58 | 37.7 | 4727 (32.6) | 1.5 | 2.34 |
| EX 6 | 30384 (70795) | 0.59 | 35.7 | 5934 (40.9) | 1.5 | 2.28 |

TABLE 8

| EXAMPLE | P/B RATIO (w/w) in starting materials | P/B RATIO (w/w) in glass microbubbles | 80% CRUSH STRENGTH, psi (MPa) | TRUE DENSITY, g/cm$^3$ | ENERGY USAGE, BTU/lb (J/g) | D$_{50}$ microns | MILLED D$_{50}$ PRIMARY FEED PARTICLE SIZE, microns | SPRAY DRIED D$_{50}$ PRIMARY FEED PARTICLE SIZE, microns |
|---|---|---|---|---|---|---|---|---|
| CE A | 0 | 0 | 1816 (12.5) | 0.73 | 31720 (73711) | 32.7 | 1.38 | 25.3 |
| CE B | 0.5 | 0.85 | 3617 (24.9) | 0.48 | 30160 (70092) | 37.3 | 1.42 | 25.5 |
| CE C | — | NM | NM | 0.98 | 29214 (67893) | 29.6 | 1.60 | 32.4 |
| CE D | 7.3 | 7.1 | NM | 0.87 | 33299 (77387) | 27.2 | 1.40 | 24.5 |
| CE E | 3.9 | 4.6 | NM | 1.08 | 29915 (69522) | 36.1 | 1.60 | 32.4 |
| EX 1 | 1.8 | 3.24 | 3455 (23.8) | 0.60 | 27600 (64142) | 38.1 | 1.50 | 30.7 |
| EX 2 | 1.8 | 1.98 | 7239 (49.4) | 0.62 | 19194 (44607) | 32.0 | 1.40 | 24.6 |
| EX 3 | 1.8 | 2.5 | 2163 (14.9) | 0.46 | 30284 (70380) | 44.2 | 1.60 | 32.4 |
| EX 4 | 1.8 | 2.8 | 1623 (11.2) | 0.50 | 30663 (71261) | 44.8 | 1.60 | 32.9 |
| EX 5 | 1.5 | 2.34 | 4727 (32.6) | 0.58 | 30049 (69894) | 37.7 | 1.42 | 30.4 |
| EX 6 | 1.5 | 2.28 | 5934 (40.9) | 0.59 | 30384 (70673) | 35.7 | 1.37 | 30.4 |

In Table 8 (above), EX1-EX2, EX6 and CEA-CEC used Strategic Materials Inc. tricolored recycled glass, and EX3-EX5 and CED-CEE used LVH Industries Inc. tricolored recycled glass.

Table 9 (below) reports results of Inductively Coupled Plasma (ICP) elemental analysis lists of the raw product produced in Comparative Examples A, B, D, and E and Examples 1 to 6. Comparative Example CEC was not analyzed for elemental content by ICP.

TABLE 9

| EXAMPLE | Elemental Analysis, ppm | | | | | | | P/B (w/w) Ratio | Elemental Analysis, ppm | | | |
|---|---|---|---|---|---|---|---|---|---|---|---|---|
| | Si | Ca | Na | K | Na + K | B | P | | Zn | Al | Mg | Zr |
| CEA | 331177 | 78701 | 56962 | 4749 | 61711 | 11115 | 600 | 0.05 | 114 | 9389 | 4349 | 3382 |
| CEB | 314786 | 74904 | 52182 | 4633 | 56814 | 10080 | 8542 | 0.84 | 96 | 8574 | 4261 | 2802 |
| CEC | NM | NM | NM | NM | NM | NM | NM | NM | NM | NM | NM | NM |
| CED | 283918 | 66687 | 58947 | 2188 | 61135 | 4259 | 30327 | 7.12 | 52 | 7860 | 3810 | 6167 |
| CEE | 308078 | 72807 | 64710 | 2636 | 67346 | 8526 | 39373 | 4.62 | 58 | 8890 | 4134 | 2890 |
| 1 | 294723 | 70124 | 56182 | 2276 | 58458 | 6131 | 19885 | 3.24 | 103 | 8520 | 4230 | 1368 |
| 2 | 308430 | 73463 | 61406 | 6087 | 67493 | 6432 | 17891 | 2.78 | 91 | 8675 | 4152 | 4289 |
| 3 | 327623 | 77015 | 63309 | 2513 | 65822 | 6108 | 15068 | 2.47 | 64 | 9401 | 4377 | 3045 |
| 4 | 327671 | 77708 | 69285 | 2428 | 71713 | 5093 | 13999 | 2.75 | 57 | 9428 | 4426 | 3064 |
| 5 | 259904 | 62400 | 52965 | 1922 | 54887 | 5999 | 14056 | 2.34 | 42 | 7814 | 4135 | 4256 |
| 6 | 261825 | 62602 | 53677 | 1985 | 55662 | 5283 | 14301 | 2.71 | 40 | 7911 | 4185 | 3524 |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. Glass microbubbles comprising, on an average basis:
   from 28.1 to 37.4 percent by weight of silicon;
   from 5.7 to 8.6 percent by weight of calcium;
   from 5.2 to 14.9 percent by weight, on a total combined weight basis, of at least one of sodium or potassium;
   from 0.3 to 0.9 percent of boron; and
   from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

2. Glass microbubbles according to claim 1, comprising from 6.4 to 7.9 percent by weight of calcium.

3. Glass microbubbles according to claim 1, comprising, on a total combined weight basis, from 6.7 to 9.1 percent by weight of at least one of sodium or potassium.

4. Glass microbubbles according to claim 1, comprising from 0.4 to 0.6 percent by weight of boron.

5. Glass microbubbles according to claim 1, comprising from 1.0 to 2.0 percent by weight of phosphorus.

6. Glass microbubbles according to claim 1, wherein the weight ratio of phosphorus to boron is in the range of from 1.8 to 2.5.

7. Glass microbubbles according to claim 1, comprising less than 0.01 percent by weight of zinc.

8. Glass microbubbles according to claim 1, wherein the glass microbubbles have a true density of less than 0.7 g/cm$^3$.

9. A method of making raw product comprising glass microbubbles, the method comprising heating and expanding feed to provide the raw product, wherein the glass microbubbles comprise, on an average basis:
   from 28.1 to 37.4 percent by weight of silicon;
   from 5.7 to 8.6 percent by weight of calcium;
   from 5.2 to 14.9 percent by weight, on a combined weight basis, of at least one of sodium or potassium;
   from 0.3 to 0.9 percent of boron; and
   from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

10. A method according to claim 9, wherein the glass microbubbles comprise from 0.4 to 0.6 percent by weight of boron.

11. A method according to claim 9, wherein the glass microbubbles have a true density of less than 0.7 g/cm$^3$.

12. A raw product comprising glass microbubbles and unexpanded glass particles, wherein on an average basis, the
   raw product comprises from 28.1 to 37.4 percent by weight of silicon;
   from 5.7 to 8.6 percent by weight of calcium;
   from 5.2 to 14.9 percent by weight, on a combined weight basis, of at least one of sodium or potassium;
   from 0.3 to 0.9 percent of boron; and
   from 0.9 to 2.6 percent of phosphorus,
wherein the weight ratio of phosphorus to boron is in the range of from 1.4 to 4.2, and wherein the glass microbubbles comprise less than 0.4 percent by weight of zinc.

13. A raw product according to claim 12, comprising from 0.4 to 0.6 percent by weight of boron.

14. A raw product according to claim 12, wherein the raw product has a true density of less than 0.7 g/cm$^3$.

* * * * *